United States Patent Office 2,742,500
Patented Apr. 17, 1956

2,742,500

RESOLUTION OF PHENYLAMINOPROPANEDIOLS AND INTERMEDIATES

Walter A. Gregory and Marvin Paulshock, Wilmington, Del., assignors to E. I. du Pont de Nemours and Company, Wilmington, Del., a corporation of Delaware No Drawing. Application December 22, 1953, Serial No. 399,818

12 Claims. (Cl. 260—559)

This invention relates to the separation of enantiomorphic forms of diastereoisomeric para-substituted phenyl aminopropanediols having a sulfur-containing group in the para position.

More particularly, the present invention relates to a novel process for the production of an optically active diastereoisomer of a para-substituted phenyl aminopropanediol using an optically active tartranil as the resolving agent and to the new adducts produced.

The para-substituted phenylaminopropane diols which are resolved in accordance with our invention have the formula

1.

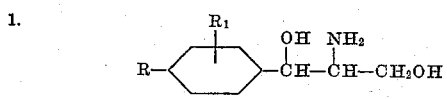

wherein R is a member of the class consisting of alkl-mercapto, alkylsulfinyl, alkylsulfonyl, sulfamyl, alkylsulfamyl, azidosulfonyl, haloalkylsulfonyl and hydrazinosulfonyl, and $R_1$ represents a member of the class consisting of hydrogen, halogen, lower alkyl and lower alkoxy.

The compounds represented by Formula 1 can exist in optical isomeric forms. Stereoisomeric forms as used herein refer to the spatial arrangement of the polar groups on the two asymmetric carbon atoms with reference to erythrose and threose. To differentiate between these two possible forms, the diastereoisomeric pair related to erythrose in configuration is designated as the erythro series and the diastereoisomeric pair related to threose as the threo series or form.

Both the erythro and threo forms exist as racemates of optically active dextro $(d)$ and levo $(l)$ rotary isomers as well as in the form of the individual or separate dextro $(d)$ and levo $(l)$ optical isomers.

In view of the difficulty in representing the various optical isomers with plane formulae, I have used the customary structural formulae and adopted the convention discussed hereafter in order to designate optical configuration. Appropriate notation is used under the formula, for example $(l)$-erythro form, $(l)$-threo form, $(d)$-threo form, $(d)$-erythro form, $(dl)$-threo form and the like.

It will be understood that where no notation appears with a structural formula or a chemical name the formula or name is to be interpreted in its generic sense; that is, as representing the $(d)$-threo isomer, $(l)$-threo isomer, $(d)$-erythro, $(l)$-erythro isomers in separated form as well as the $(dl)$-threo or $(dl)$-erythro optical racemates or the mixtures of all of the isomers and racemates. In other words, a formula or name represents not only the unresolved mixture of isomers but also the individual isomers and racemates.

Broadly speaking, the process of the present invention comprises the step of: (1) reacting the racemic amine of Formula 1, preferably in a liquid medium, with an optically active tartranil prepared from an optically active tartaric acid and aniline or a substituted aniline, (2) separating by fractional crystallization the two racemic forms of the adduct formed, and (3) hydrolyzing the desired racemic modification in an acidic or basic medium to give the desired optically active aminopropanediol of Formula 1.

The process of our invention is represented graphically in the following diagram wherein the resolving agent used is the $(d)$-isomer:

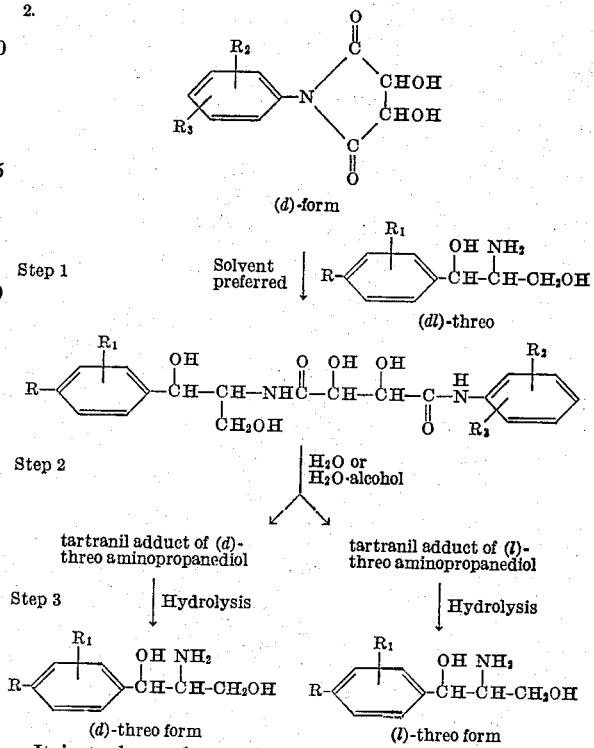

It is to be understood that the above shown graphic scheme applies also to the erythro forms of aminopropanediols.

R and $R_1$ have the same significance in Formulae 2 and 3 as they have in Formula 1. $R_2$ and $R_3$ can be the same or different and represent halogen, lower alkyl, lower alkoxy, nitro or hydrogen.

We have found the difference in solubility in water of the two of the "tartranil-adducts" of Formula 3 to be substantial and utilizing this discovery, we have invented the process which is the subject of this application.

Illustrative of the compounds of Formula 1 which can be resolved in accordance with our invention, there may be mentioned:

$(dl)$ - threo - 1 - (p - methylsulfonylphenyl) - 2 - amino - 1,3-propanediol $(dl)$ - threo - 1 - (p - ethylsulfonylphenyl) - 2 - amino - 1,3-propanediol $(dl)$ - threo - 1 - (p - n - propylsulfonylphenyl) - 2 - amino-1,3-propanediol $(dl)$ - threo - 1 - (p - isopropylsulfonylphenyl) - 2 - amino-1,3-propanediol $(dl)$ - threo - 1 - (p - methylmercaptophenyl) - 2 - amino - 1,3-propanediol $(dl)$ - threo - 1 - (p - methylsulfinylphenyl) - 2 - amino - 1,3-propanediol $(dl)$ - threo - 1 - (p - sulfamylphenyl) - 2 - amino - 1,3 - propanediol $(dl)$ - threo - 1 - (p - methylsulfamylphenyl) - 2 - amino - 1,3-propanediol $(dl)$ - threo - 1 - (p - dimethylsulfamylphenyl) - 2 - amino - 1,3-propanediol $(dl)$ - threo - 1 - (p - ethylsulfamylphenyl) - 2 - amino - 1,3-propanediol (dl) threo - 1 - (p - beta - hydroxyethylsulfamylphenyl) - 2-amino-1,3-propanediol
(dl) - threo - 1 - (p - hydrazinosulfonylphenyl) - 2 - amino-1,3-propanediol
(dl) - threo - 1 - (2 - chloro - 4 - methylsulfonylphenyl) - 2-amino-1,3-propanediol
(dl) - threo - 1 - (2 - bromo - 4 - methylsulfonylphenyl) - 2-amino-1,3-propanediol
(dl) - threo - 1 - (3 - chloro - 4 - methylsulfonylphenyl) - 2-amino-1,3-propanediol
(dl) - threo - 1 - (2 - fluoro - 4 - methylsulfamylphenyl) - 2-amino-1,3-propanediol
(dl) - threo - 1 - (2 - methoxy - 4 - sulfamylphenyl) - 2 - amino-1,3-propanediol
(dl) - threo - 1 - (3 - ethyl - 4 - chloromethylsulfonyl phenyl)-2-amino-1,3-propanediol
(dl) - threo - 1 - [p - (chloromethylsulfonyl)phenyl] - 2 - amino-1,3-propanediol
(dl) - threo - 1 - [p - (trifluoromethylsulfonyl)phenyl] - 2-amino-1,3-propanediol
(dl) - threo - 1 - (p - azidosulfonylphenyl) - 2 - amino - 1,3-propanediol
(dl) - threo - 1 - [p - (fluoromethylsulfonyl)phenyl] - 2 - amino-1,3-propanediol
(dl) - threo - 1 - [p - (bromomethylsulfonyl)phenyl] - 2 - amino-1,3-propanediol It will be understood that the corresponding erythro series of compounds can also be resolved by a practice of our invention. However, the erythro series have shown little or negligible biological activity to date and consequently are of little commercial interest.

The optically-active tartranil compounds of Formula 2, which are the resolving agents of our process, are readily prepared from an optically active tartaric acid and a member of the class consisting of aniline and substituted anilines. F. Burrow and R. G. Atkinson, J. Chem. Soc., 1939, 638–40.

Illustrative of the resolving agents which can be employed in the process of our invention there may be mentioned the following:

d-tartranil
d-4'-methyltartranil
d-4'-methoxytartranil
d-4'-chlorotartranil
d-4'-nitrotartranil
d-2',4'-dichlorotartranil
d-2'-bromotartranil Of these we prefer d-tartranil.

Step 1 of our process comprising mixing a tartranil of Formula 2 with a phenyl aminopropanediol of Formula 1. The order of mixing is not critical. The reaction is preferably carried out in the presence of a solvent. However, a solvent is not essential.

If a solvent is employed in Step 1 we prefer to use pyridine. However, the advantages of using a solvent are realized to a substantial extent provided a tertiary amine, cyclic ether such as dioxane, or an amide such as, for example, dimethylformamide or dimethylacetamide, is employed. Preferably, the solvent should be anhydrous.

Broadly speaking, the tartranil and the diol are reacted in substantial equimolar amounts. In those instances where a solvent is employed, the quantity of solvent usually present is substantially equal to 2 liters per mol of the phenylaminopropanediol.

The preferred temperature for carrying out Step 1 using pyridine as the solvent is in the range of from 100 to 115° C. However, the advantages are realized to a substantial extent at any temperature within the range of from 20 on up to 200° C. At higher temperatures, higher boiling solvents should be used. Any temperature above 20° up to the boiling point of a solvent mixture is beneficial and effective. Temperatures above the normal boiling temperature can be used by operating under superatmospheric pressure.

When Step 1 is run in pyridine at reflux temperature, the desired reaction, that is the formation of the adducts of Formula 3, is completed within a period of from one-half to one hour. In general, the time required to carry out Step 1 may vary from about a few minutes to several hours.

Upon completion of the reaction between the phenyl-aminopropanediol of Formula 1 and the resolving agent, a hydroxylic solvent is added to the reaction mixture. The hydroxylic solvent which is used in this step, Step 2, is preferably water. But mixtures of water with any of a variety of normally liquid alcohols, such as for example, water and methanol, water and ethanol, and the like, may be used to advantage. After the addition of the hydroxylic solvent, the solution of the adduct prior to concentration to effect separation may contain up to about 25% of a water-miscible solvent of Step 1.

Although the proportions of the adduct and hydroxylic solvent for satisfactory results are somewhat interdependent, they may be varied within wide limits.

The aqueous or aqueous alcohol solution of the adduct of Formula 3 is concentrated until a substantial amount of the adduct has precipitated from the solvent mixture. The solid product, which we refer to herein as tartranila-minopropanediol adduct, is separated by filtration. In many instances this adduct consists mainly of one of the two possible diastereoisomeric forms. The two forms of the adduct of Formula 3 may be further separated by fractional crystallization to give the two diastereoisomeric forms. Any of a wide variety of polar solvents may be employed for fractional crystallization. There can be used for instance, acetonitrile, tetrahydrofuran, nitromethane, dimethylformamide, dimethylacetamide, dioxane, pyridine, nitrobenzene and ethylacetate.

The desired form is hydrolyzed with a mineral acid or with aqueous alkali to the (d)-threo-form of the aminopropanediol of Formula 1.

The desired optically active enantiomorph of the aminopropanediol can be recovered from the hydrolysing solution by any of several methods. One of the methods of recovering the optically active enantiomorphs in Step 3 following hydrolysis of the tartranil-aminopropanediol adduct is by use of an ion exchange resin. Any conventional exchange material may be utilized in the above process. We prefer to use a synthetic resin exchange material, for example, Amberlite–IR–400 when the hydrolysis has been effected with acid.

While the foregoing discussion has related only to the application of d-tartranil in the resolution of racemic or (dl) - p - substituted phenylaminopropanediol, the same method may obviously be applied to partially resolved compositions, that is to say, those in which the ratio of the dextro form to the levo form is other than 1:1.

Also, it will be noted that the optical purity of the tartranil-diol adduct produced is in general somewhat less than 100%. If it is desired to obtain an adduct of higher purity, this may be accomplished by recrystallizing the adduct from an appropriate solvent, for instance, ethyl alcohol, nitromethane or alcohol-water mixtures. If desired, the more soluble form of the adduct may be recovered from the mother liquor, and hydrolyzed to give the optical antipode of the aminopropanediol obtained from the less soluble adduct.

The phenylaminopropanediol-tartranil adducts which are obtained by Steps 1 and 2 of the process of the invention and which are represented by Formula 3, are of value not only as intermediates in getting to a desired optically active antibiotic substance but they also have utility as inhibitors of the action of sulfuric acid upon ferrous metals.

The final products obtained from the process of the invention are of value as intermediate products for the preparation of synthetic antibiotic substances. The 1 - p - methylsulfonylphenyl - 2 - aminopropane - 1,3 - diol of Example 1, can, for example, be converted to (d)-threo- 1-p-methylsulfonylphenyl-2-dichloroacetamido-propane,1,3-diol by dichloracetylation. This dichloro derivative is a very valuable antibiotic useful against bacterial and Ricksettsial infections.

Likewise, other individual isomers prepared by the process of this invention are readily convertible to the corresponding acylamido derivatives which are useful as bactericides and pharmaceuticals. These acylamido derivatives and their conversion from the free amino compounds are fully described in the copending applications of Walter A. Gregory, Serial Nos. 257,986, 296,959, now U. S. Patent 2,680,135, 333,020, now U. S. Patent 2,680,120, and 384,794, now abandoned, respectively filed November 23, 1951, July 2, 1952, January 23, 1953 and October 7, 1953.

In order to better understand the nature of this invention, reference should be had to the following illustrative examples:

Example 1

There are dissolved in 2000 parts of pyridine 245 parts of (dl)-threo-1-(p-methylsulfonylphenyl)-2-amino-1,3-propanediol and 207 parts of d-tartranil. The solution is heated at refluxing temperature for a period of one hour. 6000 parts of water are added. The solution is concentrated to about one-half its original volume by distillation of the water under reduced pressure at a temperature of from 90 to 100° C.

During the concentration a yellow solid settles out. The water is removed from the reaction vessel by inverse filtration.

To the vessel containing the yellow solid there is added 1500 parts of water and 200 parts of 36% hydrochloric acid. The reaction mixture is refluxed for a period of 6 hours. The resulting solution is concentrated under reduced pressure to dryness. One thousand parts of water are then added to the dry material and the resulting solution is passed thru a column containing an IR 400 ion exchange resin.

Water washings in the resin column are continued until the solution leaving the column has a pH of about 7. The combined washings are concentrated to dryness under reduced pressure, and the resulting solid product is crystallized from 625 parts of alcohol.

A crude yield of 82 parts of resolved threo-1-(p methylsulfonylphenyl)-2-amino-1,3-propanediol having a levo rotation at 2% in ethanol and a dextro rotation at 2% in tetrahydrofuran) M. P. 134–140° C. is obtained. Crystallization from 500 parts of alcohol gives a yield of 67 parts of purified product, M. P. 142.5–144.

Example 2

273 parts of (dl)-threo-1-(p-propylsulfonylphenyl)-2-amino-1,3-propanediol and 242 parts of d-4'-chlorotartranil are dissolved in 2000 parts of dioxane. The reaction mixture is heated to refluxing temperature for a period of about one hour.

To the reaction mixture there is added 6000 parts of water. The solution is concentrated to approximately one-half its original volume by distillation of the water under reduced pressure at a temperataure of from 90–100° C. During the concentration a yellow solid settles out. The water is removed from the reaction vessel by inverse filtration.

To the yellow solid in the vessel there are added 1500 parts of water and 200 parts of 36% sulfuric acid. The reaction mixture is refluxed for a period of 6 hours. The resulting solution is concentrated under reduced pressure to dryness. To the dried material there is added 1000 parts of water. The solution is passed thru a column containing IR 400 ion exchange resin.

Water washings in the column are continued until the solution leaving the column has a pH of about 7. The combined washings are concentrated to dryness under reduced pressure, and the resulting solid product is crystallized from 625 parts of ethanol.

A crude yield of 74 parts of resolved threo-1-(p-propylsulfonylphenyl)-2-amino-1,3-propanediol is obtained.

Example 3

To a mixture containing 260 parts of (dl)-threo-1-(p-methylsulfamylphenyl)-2-amino-1,3-propanediol and 253 parts of d-4'-nitrotartranil there is added 2000 parts of dimethylformamide (DMF). The mixture dissolves in the DMF. The DMF solution is heated at reflux temperature for a period of one hour. 6000 parts of water are then added. The resulting solution is concentrated to about one-half its original volume by distillation of the water under reduced pressure at a temperature of from 90–100° C.

During the concentration a yellow solid settles out. The water is removed from the reaction system by inverse filtration.

1500 parts of water and 200 parts of hydrochloric acid are added to the vessel containing the yellow solid. This reaction mixture is refluxed for a period of six hours. The solution is concentrated under reduced pressure to dryness.

1000 parts of water are added to the solid material. The resulting solution is passed thru a column containing IR 400 ion/exchange resin. Water washings in the resin column are continued until the solution leaving the column has a pH of about 7.

The combined washings are concentrated to dryness under reduced pressure. The solid product is crystallized from 600 parts of ethyl alcohol. A crude yield of 83 parts of resolved threo-1-(p-methylsulfamylphenyl)-2-amino-1,3-propanediol is obtained.

Example 4

A mixture consisting essentially of 213 parts of (dl)-threo-1-(p-methylmercaptophenyl)-2-amino-1,3-propanediol and 207 parts of d-tartranil are dissolved in 2000 parts of pyridine. This mixture is heated at reflux temperature for a period of one hour. There is added to it 6000 parts of water. The solution which results is concentrated to approximately one-half its original volume by distillation of the water at reduced pressure at a temperature of from 90–100° C.

A yellow product settles out from the reaction system during the concentration. Water is removed from the reaction equipment by inverse filtration.

To the yellow solid there is added 1500 parts of water and 200 parts of 36% hydrochloric acid. The resulting reaction mixture is refluxed for a period of six hours. The solution is concentrated under reduced pressure to dryness. 1000 parts of water are added to this solid residue. The resulting aqueous solution is passed through a column containing an IR 400 ion exchange resin. Water washings in the resin column are continued until the solution leaving the column is substantially neutral. The combined washings are concentrated to dryness under reduced pressure. The solid material is crystallized from 620 parts of alcohol. A crude yield of resolved threo-1-(p-methylmercaptophenyl)-2-amino-1,3-propanediol is obtained.

We claim:

1. The process which comprises mixing enantiomorphs of a disastereoisomeric para-substituted phenylaminopropanediol having a sulfur-containing group in the para position, said phenylaminopropanediol having the formula

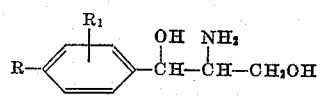

wherein R is a member of the class consisting of alkylmercapto, alkylsulfinyl, alkylsulfonyl, sulfamyl, alkylsulfamyl, azidosulfonyl, haloalkylsulfonyl and hydrazinosulfonyl and $R_1$ is a radical selected from the class consisting of hydrogen, halogen, lower alkyl, and lower alkoxy with a substantially equimolar amount of an optically active tartranil having the formula

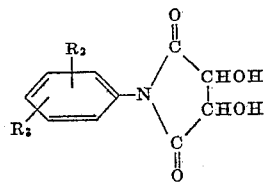

wherein $R_2$ and $R_3$ are members of the class consisting of hydrogen, halogen, lower alkyl, lower alkoxy and nitro, to produce disastereoisomeric adducts of the formula

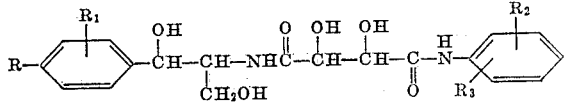

wherein R, $R_1$, $R_2$ and $R_3$ have the same significance as above.

2. The process of claim 1 wherein the diasteroisomeric tartranil-aminopropanediol adducts are separated by fractionally crystallizing them from a polar solvent.

3. The process of claim 1 wherein the reaction between the aminopropanediol and the tartranil is effected in a liquid medium.

4. The process which comprises mixing in pyridine at a temperature of from 20° to 200° C. enantiomorphs of a disastereoisomeric para-substituted phenylaminopropanediol having a sulfur-containing group in the para position, said phenylaminopropanediol having the formula

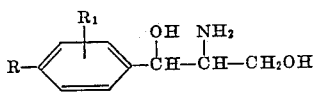

wherein R is a member of the class consisting of alkylmercapto, alkylsulfinyl, alkylsulfonyl, sulfamyl, alkylsulfamyl, azidosulfonyl, haloalkylsulfonyl and hydrazinosulfonyl and $R_1$ is a radical selected from the class consisting of hydrogen, halogen, lower alkoxy and lower alkyl, with a substantially equimolar quantity of $d$-tartranil, adding a hydroxylic solvent to the reaction mixture containing the resulting diastereoisomeric tartranil-aminopropanediol adducts, and concentrating the solution, whereby a precipitate enriched in one of the forms of the adduct is obtained.

5. The process of claim 4 wherein the phenylaminopropanediol is $(dl)$-threo-1-(p-methylsulfonylphenyl)-2-amino-1,3-propanediol.

6. The process of claim 4 wherein the phenyl-aminopropanediol is $(dl)$-threo-1-(p-methylsulfamylphenyl)-2-amino-1,3-propanediol.

7. The process of claim 4 wherein the phenyl-aminopropanediol is $(dl)$-threo-1-(p-sulfamylphenyl)-2-amino-1,3-propanediol.

8. The process of claim 4 wherein the phenyl-aminopropanediol is $(dl)$-threo-1-(p-methylmercaptophenyl)-2-amino-1,3-propanediol.

9. The process of claim 4 wherein the phenyl-aminopropanediol is $(dl)$-threo-1-[p-chloromethylsulfonylphenyl]-2-amino-1,3-propanediol.

10. A compound of the formula

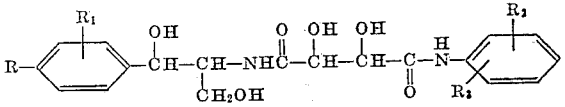

wherein R is a member of the class consisting of alkylmercapto, alkylsulfinyl, alkylsulfonyl, sulfamyl, alkylsulfamyl, azidosulfonyl, haloalkylsulfonyl and hydrazinosulfonyl, $R_1$ is a radical of the class consisting of hydrogen, halogen, lower alkoxy and lower alkyl, and $R_2$ and $R_3$ are members of the class consisting of hydrogen, halogen, lower alkyl, lower alkoxy, and nitro.

11. A process for resolving the dextro- and levo-forms of threo-1-(p-methylsulfonylphenyl)-2-amino-1,3-propanediol which comprises mixing in pyridine at a temperature of from 100° to 115° C. substantially equimolar quantities of $d$-tartranil and $dl$-threo-1-(p-methylsulfonylphenyl)-2-amino-1,3-propanediol, adding water to the reaction mixture containing the resulting diastereoisomeric $d$-tartranil-threo-1-(p-methylsulfonylphenyl)-2-amino-1,3-propanediol adducts, concentrating the aqueous mixture whereupon the water-insoluble isomer separates, collecting said isomer and hydrolyzing it to levo-1-(p-methylsulfonylphenyl)-2-amino-1,3-propanediol.

12. A compound of the formula

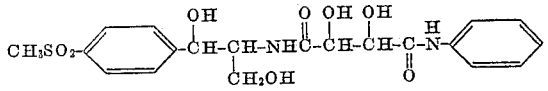

References Cited in the file of this patent
UNITED STATES PATENTS

| | | |
|---|---|---|
| 2,483,885 | Crooks et al. | Oct. 4, 1949 |
| 2,680,120 | Gregory | June 1, 1954 |
| 2,680,135 | Gregory | June 1, 1954 |

OTHER REFERENCES

Cutler: "JACS," vol. 74, November 5, 1952, pp. 5475–81.

Suter et al: "JACS," vol. 75, September 5, 1953, pp. 4330–33.